United States Patent

Rawson et al.

[15] 3,651,463

[45] Mar. 21, 1972

[54] SWITCH CODING CIRCUITRY

[72] Inventors: Edward B. Rawson, Lincoln; John B. Dowling, Stow, both of Mass.

[73] Assignee: Medidata Sciences, Inc., Waltham, Mass.

[22] Filed: Apr. 17, 1970

[21] Appl. No.: 29,422

[52] U.S. Cl. ........................340/147 R, 340/166 R, 340/365, 178/17

[51] Int. Cl. ..........................................................H04q 3/00

[58] Field of Search ....................340/147, 345, 166; 178/17, 178/26, 79

[56] References Cited

UNITED STATES PATENTS

| | | | |
|---|---|---|---|
| 3,201,777 | 8/1965 | Brown | 340/345 |
| 3,257,644 | 6/1966 | Moore | 340/345 X |
| 3,435,413 | 3/1969 | Weld | 340/147 |
| 3,436,477 | 4/1969 | Ghiringhelli | 178/26 |
| 3,530,239 | 9/1970 | Corell et al. | 178/79 X |

OTHER PUBLICATIONS

Applicants Citation: EEE Magazine, May 1969 pp. 24– 25, " Scanning Keyboard Encoder"

*Primary Examiner*—Donald J. Yusko
*Attorney*—Joseph Weingarten

[57] ABSTRACT

Switch coding circuitry common to a plurality of mechanically unrelated input switches and operative to provide detection of a valid switch actuation and to provide a digital representation of the identity of an actuated switch.

7 Claims, 3 Drawing Figures

INVENTORS
EDWARD B. RAWSON
JOHN B. DOWLING
BY
ATTORNEYS

INVENTORS
EDWARD B. RAWSON
JOHN B. DOWLING
BY
ATTORNEYS

INVENTORS
EDWARD B. RAWSON
JOHN B. DOWLING
BY Joseph Weingarten
Stanley M. Schurgin
ATTORNEYS

SWITCH CODING CIRCUITRY

FIELD OF THE INVENTION

This invention relates to digital coding circuitry and more particularly to circuitry for detecting a switch actuation and for providing an identification of selected switch actuation.

BACKGROUND OF THE INVENTION

Electrical switches are widely employed for purposes of data entry into a data processing system and are often arranged for manual actuation on an entry console. For suitable processing of input data, the processing system must identify a particular switch that has been actuated and in many cases must deactivate other switches when data is being entered from a selected switch. Moreover, a valid switch actuation must be detected, to the exclusion of spurious actuation such as caused by switch contact bounce. In order to provide data entry from only a selected switch, it has been conventional practice to employ mechanically interrelated switch arrays wherein actuation of a single switch causes mechanical lockout of other switches in the array.

Such mechanically interrelated switch arrays provide the intended lockout of switches, but at the expense of a rather expensive and via respective resistors 11 cumbersome mechanical assembly. Elimination of the effects of contact bounce and coding of switch actuation have conventionally been accomplished by use of separate circuitry for each data entry switch such that actuation of a particular switch causes its associated circuitry to provide a switch output indication and a digital representation of that switch identity. This conventional approach requires redundant circuitry which can add considerably to the expense and complexity of a system, especially where a large number of switches are employed.

SUMMARY OF THE INVENTION

In accordance with the present invention, a switch coder is provided in which a plurality of mechanically unrelated switches is simply and uniquely coded by means of central coding circuitry which is also operative to eliminate the effects of switch contact bounce. By use of the invention, simple and less costly single-pole single-throw switches can be employed and coding circuitry provided common to the plurality of input switches to achieve intended operation. The common coding circuitry also provides electrical interlocking of the mechanically unrelated input switches to provide entry of data from only a single actuated input switch.

The invention includes a multiplexer operating under the government of a binary counter to sequentially scan a plurality of input switches and to detect actuation of a switch. The counter output is representative of the actuated switch identity and this output is utilized only after a verification period during which time spurious contact actuation, caused by contact bounce, is discriminated against. Presence of an input signal from the actuated switch at the end of the verification interval denotes detection of a valid switch closure. The digital representation of the actuated switch identity is provided to utilization apparatus such as a computer and an output indication of switch actuation is also provided to utilization means. It will be appreciated that an output signal representative of switch actuation is provided only after an interval of time sufficient to eliminate the transient effects of contact bounce. Thus, an output signal is provided which is free of contact bounce noise, and additionally a coded digital signal is provided which is representative of the identity of a valid switch actuation.

DESCRIPTION OF THE DRAWINGS

The invention will be more fully understood from the following detailed description taken in conjunction with the accompanying drawings, in which.

DETAILED DESCRIPTION OF THE INVENTION

Figure 1:
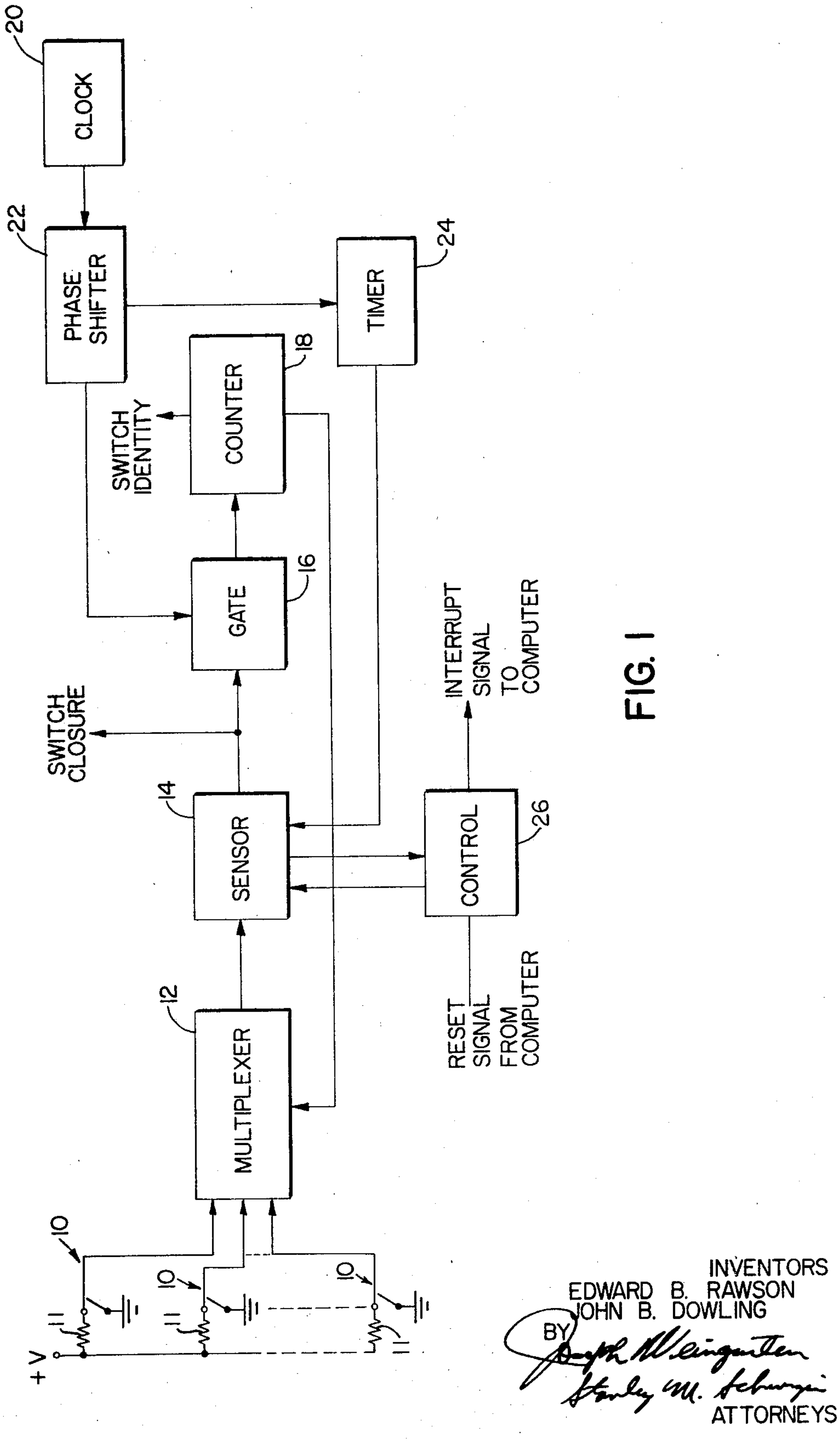
FIG. 1 is a block diagram of the invention.

Referring to FIG. 1 there is shown a plurality of switches 10, each of which is connected between a source of potential +V and a source of reference potential such as ground. The switches 10 are single-pole single-throw switches and are mechanically unrelated one to the other. The switches can be, for example, toggle or pushbutton switches, and typically are arranged as part of a control console such as used in a data entry system. It is the purpose of the invention to detect a proper switch actuation to discriminate against the effects of contact bounce, and to identify the particular actuated switch. In the illustrated embodiment, the switches are normally open and the invention is operative to detect switch closures. Alternatively, the switches can be normally closed and the invention employed to detect the opening of a switch.

The switches 10 are each connected to a multiplexer 12, the output of which is connected to a sensor 14. Sensor 14 is, in turn, connected to a gate 16, the output of which is connected to a binary counter 18 which is operative to control multiplexer 12 and which is also operative to provide a coded output indication of the identity of an actuated switch. System timing is provided by a clock 20 connected to a phase splitter 22 which applies respective timing pulses to gate 16 and to a timer 24 which is also connected to sensor 14. Control circuitry 26 is coupled to sensor 14 and is operative to receive reset signals from a computer or other utilization apparatus with which the invention is employed, and to produce interrupt signals for the computer.

In operation, counter 18 is caused to run through its counting sequence, the sequential output count being operative to cause multiplexer 12 to scan the multiplexer inputs coupled to respective switches 10. If switches 10 all remain open, multiplexer 10 continues to scan the switch inputs under the government of counter 18 until a switch is closed. Closure of a switch 10 causes a change in voltage level which is sensed by multiplexer 12, the multiplexer providing an output signal to sensor 14. Clock pulses are also applied to sensor 14 by means of phase-splitter 22 and timer 24. An output signal from sensor 14 is provided to gate 16 only if the signal from multiplexer 12 is present as an input to sensor 14 after elapse of a timing interval determined by timer 24. The timing interval is selected to be greater than the expected contact bounce time exhibited by the input switches 10, and thus a switch closure is not processed until it is determined to be a valid input signal. If the input switch remains closed after the timing interval determined by timer 24, then sensor 14 provides an input signal to gate 16 which also receives clock pulses from phase splitter 22. Gate 16 provides an output signal operative to stop operation of counter 18, the counter output being a digital representation of the identity of the actuated switch. Sensor 14 also provides, after the verification interval, an output signal representation of a switch closure and free of contact bounce noise.

It will be appreciated that the invention employs relatively simple circuitry which is common to the entire array of input switches and which provides output indications of switch actuation and switch identity only after elimination of the effects of switch contact bounce and detection of a true switch actuation. A false switch actuation, such as might be caused by vibration or momentary force on a switch, does not cause false entry of data to an associated computer or other utilization means, as the false actuation is discriminated against in accordance with the invention. In like manner, contact bounce noise does not cause erroneous data entry as a switch actuation signal is not further processed until such noise has ceased.

The output signals from the novel coding circuitry are read by the computer under instructions provided by control circuitry 26. An output signal from sensor 14 causes control circuitry 26 to provide an interrupt signal to the associated computer to, in effect, cause the computer to read the system output signals provided by sensor 14 and counter 18. After the computer has read the switch actuation signals, a reset signal is applied by the computer to control circuitry 26 to again cause sequential scanning of input switches 10 in search for another switch actuation.

Figure 2:
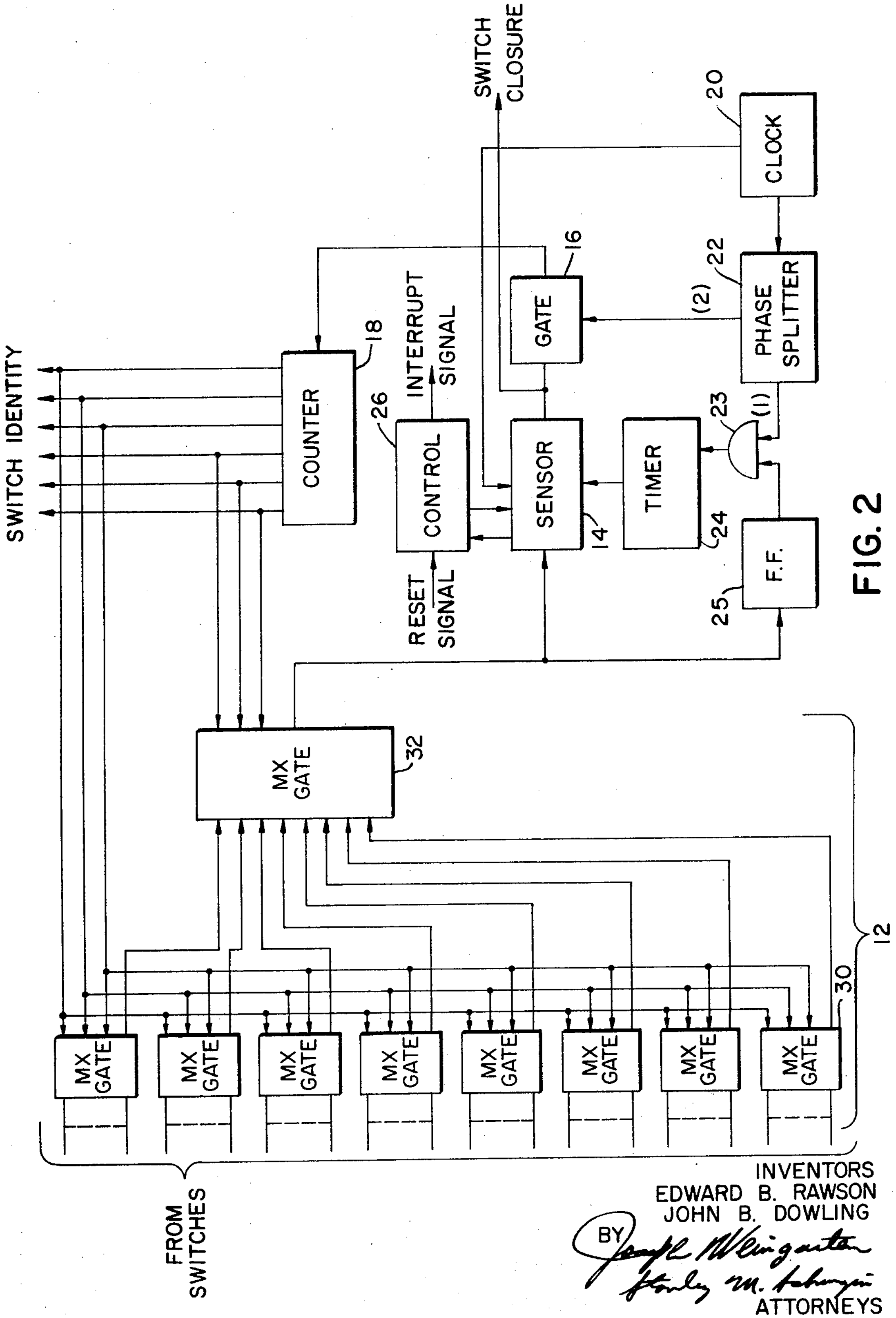
FIG. 2 is a more detailed block diagram of the invention.

A typical implementation of the invention is illustrated in FIG. 2. The multiplexer 12 in the illustrated embodiment is a 64 input multiplexer comprising eight integrated circuit gates 30 each having eight input terminals connected to respective input switches. Each gate 30 has three control terminals connected in parallel to the respective three least significant bits of the binary counter 18. The output terminal of each of gates 30 is coupled to a respective input of integrated circuit gate 32. Gate 32 has three control terminals connected respectively to the three most significant bits of counter 18. The output of terminal of gate 32 is connected to an input of sensor 14.

Under the control of counter 18, the three least significant bits of the counter output address the gates 30 to sequentially scan the eight inputs of each gate simultaneously. The three most significant bits of the counter output address gate 32 and cause sequential scanning of its eight inputs. Actuation of a selected input switch will cause an output signal from the particular gate 30 which is coupled to the actuated switch, to be applied to gate 32. The three most significant bits of the counter output are representative of the particular gate 30 associated with the actuated switch, while the three least significant bits are representative of the particular input of gate 30 associated with the actuated switch. Thus, a six bit coded representation is provided which uniquely identifies the actuated switch. According to the invention, however, the coded switch output is not read out until a validity check has been accomplished as described hereinabove.

Figure 3:
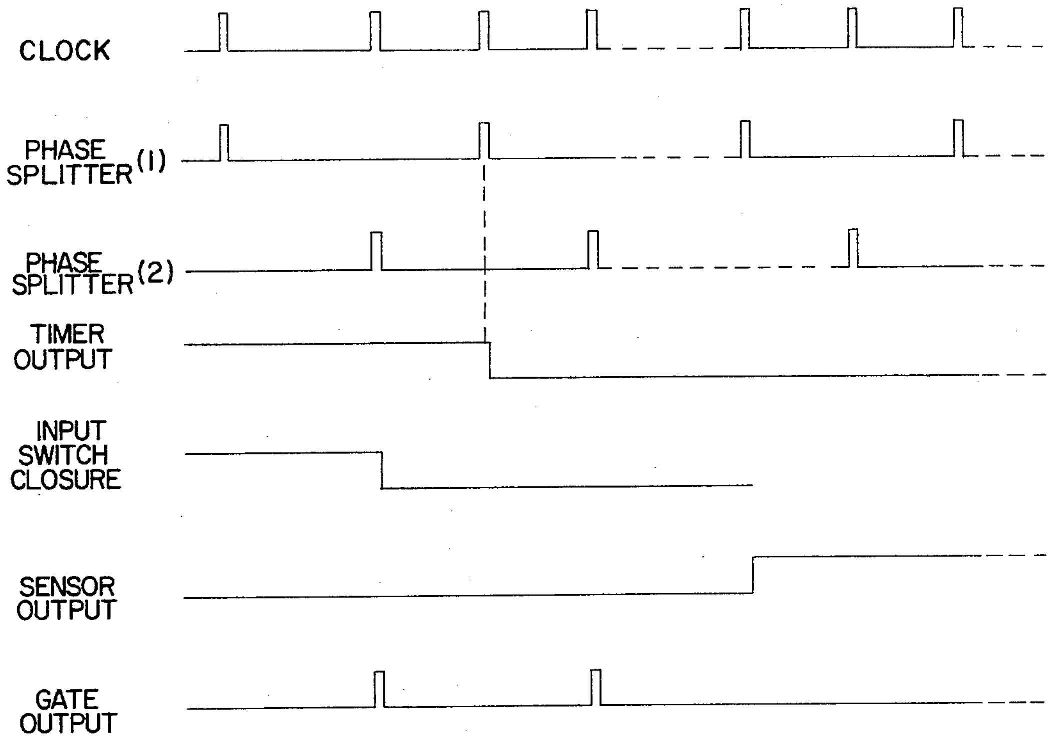
FIG. 3 is a timing diagram useful in illustrating operation of the invention.

The description which continues of the embodiment of FIG. 2 is considered in conjunction with the timing diagrams of FIG. 3. The clock 20 provides timing pulses to the system by way of phase splitter 22, which provides a first train of timing pulses, labeled (1), of half the frequency of the input clock pulses, and a second train of timing pulses labeled (2), also of half the frequency of the input clock pulses but phase shifted 180° with respect to pulse train (1). The pulse train (1) is applied via an AND-gate 23 to the timer 24. The output signal from the multiplexer gate 32 is applied to a flip-flop 25, the output of which is connected to an input of AND-gate 23. In the absence of an output signal from gate 32. clock pulses (1) from phase splitter 22 are gated via AND-gate 23 to timer 24 which provides an output signal to sensor 14 under the repetitive receipt of clock pulses. When, however, a switch closure is detected, and an output signal correspondingly provided by gate 32, flip-flop 25 is caused to change state, removing its output signal from AND-gate 23 and therefore also removing clock pulses from timer 24. Upon the removal of input clock pulses to timer 24, the timer experiences an output level change of a duration selected to be longer than the expected contact bounce time of the input switches. Typically, this timing interval is 10 milliseconds. At the end of the timing interval provided by timer 24, sensor 14 is operative to provide an output signal in response to the next received clock pulse from clock 20 so long as an input signal from gate 32 is also received by sensor 14.

The sensor output signal represents the closure of the actuated input switch and is free of any spurious components which may be caused by switch contact bounce. The sensor output signal is also applied to gate 16 which, upon receipt of the signal from sensor 14, ceases to provide output clocking signals to counter 18. The counter is thereby stopped at a binary count representative of the identity of the actuated input switch, and the binary output of counter 18 provides a coded switch identification for use by the associated computer. It should be evident that an output signal will not be provided by sensor 14 in the event of contact bounce since the timer 24 is in this event caused to retime by receipt of clock pulses from phase splitter 22.

The invention can be implemented in various ways to suit particular operating requirements. In general, integrated circuitry is employed and the entire coding system can be provided on a single logic card. It is not intended to limit the invention by what has been particularly shown and described except as indicated in the appended claims.

What is claimed is:

1. Switch coding circuitry operative to provide a binary coded indication of the actuation of one switch amongst a plurality of switches, said system comprising:

a multiplexer receiving a plurality of inputs each containing a signal representative of the condition of one switch in said plurality of switches, and operative in response to interrogation by a binary signal to provide an output signal indicative of the condition of the one of said plurality of switches corresponding to the binary signal;

counter means operative to cycle through a plurality of binary states and providing said binary signal to said multiplexer as a signal representative of the binary state of said counter means;

sensor means for detecting an actuation output signal from said multiplexer indicative of an actuated condition of one of said plurality of switches;

timing means operative in response to said actuation output signal from said multiplexer for generating a gate timing interval;

said sensor means being operative in response to said gate timing interval signal to provide a sensor output signal in response to detection of an actuation output signal after the elapse of said gate timing interval, said sensor output signal being representative of a valid switch actuation; and means operative in response to said sensor output signal for inhibiting cycling of said counter means, the binary state at which said counter means is inhibited being said binary coded representation identifying the actuated switch of said plurality of switches.

2. Circuitry according to claim 1 wherein said multiplexer includes a plurality of first multiplexer gates each having a plurality of input terminals, an output terminal and multi-bit control terminals, each of said input terminals adapted to be connected to a respective switch;

a second multiplexer gate having a plurality of input terminals each connected to a respective output terminal of said first multiplexer gates, an output terminal connected to said sensor means and multi-bit control terminals;

the control terminals of said first multiplexer gates each being connected to the least significant bits of said counter output, the control terminals of said second multiplexer gate being connected to the most significant bits of said counter output.

3. Circuitry according to claim 2 wherein said timing means includes clock means for providing clock signals;

bistable gate means operative in response to the output signal from said second multiplexer gate to change its output condition; and an AND gate having an input coupled to the output of said bistable gate means, a second input coupled to said clock means and an output coupled to said timing means;

said AND gate being operative to remove clock pulses from said timing means in the presence of an output signal from said second multiplexer gate thereby to initiate said timing gate.

4. Circuitry according to claim 3 including control means for producing an interrupt signal upon the occurrence of an output signal from said sensor means.

5. Circuitry according to claim 3 including control means for producing an interrupt signal upon the occurrence of an output signal from said sensor means, and for resetting said circuitry upon receipt of a reset signal.

6. Circuitry according to claim 3 wherein said clock means provides first clock pulses to said AND gate, and second clock pulses phase shifted by 180° from said first clock pulses to said gate means.

7. The system of claim 1 further including means for causing said timer means to reinitiate said gate timing interval signal intermediate of each count of said counter.

* * * * *